United States Patent
Larsson

(10) Patent No.: US 7,883,383 B2
(45) Date of Patent: Feb. 8, 2011

(54) METHOD AND ARRANGEMENT FOR CONTROLLING A DRIVE ARRANGEMENT IN A WATERCRAFT

(75) Inventor: Anders Larsson, Göteborg (SE)

(73) Assignee: CPAC Systems AB, V. Frölunda (SE)

( * ) Notice: Subject to any disclaimer, the term of this patent is extended or adjusted under 35 U.S.C. 154(b) by 145 days.

(21) Appl. No.: 12/159,990

(22) PCT Filed: Feb. 1, 2006

(86) PCT No.: PCT/SE2006/000147

§ 371 (c)(1),
(2), (4) Date: Jul. 3, 2008

(87) PCT Pub. No.: WO2007/089177

PCT Pub. Date: Aug. 9, 2007

(65) Prior Publication Data

US 2009/0004930 A1    Jan. 1, 2009

(51) Int. Cl.
*B63H 21/22* (2006.01)
*B63H 23/00* (2006.01)

(52) U.S. Cl. .......................................... 440/1
(58) Field of Classification Search ............... 440/1, 440/53, 84; 114/144 R, 144 A, 144 B, 144 RE, 114/151
See application file for complete search history.

(56) References Cited

U.S. PATENT DOCUMENTS 3,143,995 A * 8/1964 Koppen ...................... 440/62

| | | | |
|---|---|---|---|
| 6,142,841 A | 11/2000 | Alexander, Jr. et al. | |
| 6,234,853 B1 | 5/2001 | Lanyi et al. | |
| 7,305,928 B2 * | 12/2007 | Bradley et al. ........... | 114/144 R |
| 2004/0014373 A1 | 1/2004 | McKenney et al. | |
| 2005/0263058 A1 * | 12/2005 | Suemori et al. .......... | 114/144 R |

FOREIGN PATENT DOCUMENTS

WO      02058989 A1     8/2002

OTHER PUBLICATIONS

International Search Report for corresponding International Application PCT/SE2006/000147.
International Preliminary Report on Patentability for corresponding International Application PCT/SE2006/000147.

* cited by examiner

*Primary Examiner*—Daniel V Venne
(74) *Attorney, Agent, or Firm*—WRB-IP LLP

(57) ABSTRACT

A method is provided for controlling a drive arrangement in a watercraft. The method includes detecting thrust and steering commands from an operating device which is connected to a control unit, and controlling the drive arrangement based on detected commands from the operating device for obtaining a desired course of travel of the watercraft, wherein a force is generated which acts towards a defined position on the watercraft. The method furthermore includes determining the speed of the watercraft and adapting the position on which the force from the drive arrangement acts as a function of at least the speed and as a function of the influence of the position of the center of pressure of the watercraft, thereby maintaining the desired course of travel. An arrangement for controlling a drive arrangement in a watercraft is also provided.

11 Claims, 4 Drawing Sheets

METHOD AND ARRANGEMENT FOR CONTROLLING A DRIVE ARRANGEMENT IN A WATERCRAFT

BACKGROUND AND SUMMARY

The present invention relates to a method for controlling a drive arrangement in a watercraft, comprising: detecting thrust and steering commands from an operating device which is connected to a control unit; controlling said drive arrangement based on detected commands from said operating device, for obtaining a desired course of travel of the watercraft, wherein a force is generated which acts towards a defined position on said watercraft; and determining the speed of the watercraft.

The invention also relates to an arrangement for controlling a drive arrangement in a watercraft, comprising: an operating device for detecting thrust and steering commands; a control unit being arranged for controlling said drive arrangement based on detected commands from said operating device, for obtaining a desired course of travel of the watercraft, said control unit being arranged for generating a force which acts towards a defined position on said watercraft; a speed detector for determining the speed of the watercraft.

When controlling a watercraft, for example in the form of smaller ships and leisure boats, there is a general need for arrangements which allow a precise control of the thrust and steering of the watercraft. In particular, there is a need for a arrangements providing accurate control of the watercraft during docking. In this regard, the term "docking" refers to a maneuver in which a watercraft is propelled towards a harbor, marina or pier in order to be landed and secured.

In certain situations, the docking maneuver can be quite difficult for the driver of the watercraft, for example when the watercraft must be landed with one of its sides towards the harbor, for example in a space between two other boats. Such a situation can be simplified if the watercraft is arranged to be propelled in the sideways direction, i.e. in a direction which is generally transverse to the longitudinal direction of the watercraft.

Such a sideways movement of a watercraft can be carried out if the watercraft is provided with two drive arrangements which are separately controllable, i.e. independently of each other. The drive arrangements can for example be in the form of conventional combustion engines which are connected to propellers. By shifting one of the engines into reverse and operating the other engine in forwards drive, while at the same time carefully adjusting the steering angles of the two propellers, the watercraft can be brought to move in a direction which is essentially transverse to its longitudinal direction.

A similar type of docking maneuver can also be obtained in watercraft provided with bow thrusters or stern thrusters. A bow thruster comprises a propeller which is mounted in the bow, generally transverse to the longitudinal direction of the watercraft, in order to generate a side force on the bow. In this manner, the watercraft can be more easily controlled when docking or maneuvering at low speeds. A similar arrangement, a so-called stern thruster, can be provided in the stern of a watercraft.

As mentioned above, it is important to be able to control the watercraft in a manner so that it may travel correctly in the sideways direction, i.e. transverse to the longitudinal direction of the watercraft, during a docking maneuver. In order to obtain this desired course of travel, the drive arrangement can be controlled so that the sum of forces acting on the watercraft acts upon a specified position corresponding to the center of gravity of the watercraft. Assuming that the speed of the watercraft is relatively low, this will normally lead to a situation wherein the watercraft moves in a straight sideways direction.

However, during a docking maneuver, the movements of the watercraft may sometimes deviate from a perfect sideways direction. For example, the watercraft may assume a direction of travel which follows a curved path, which obviously is a disadvantage. Such a situation may for example be due to a rotating torque acting on the watercraft when travelling.

Consequently, an intention of steering a watercraft along a course which is transverse to the longitudinal direction of the watercraft may in fact lead to a curve-shaped course of travel of the watercraft For this reason, there is a demand for arrangements and methods in which such a tendency to rotate can be eliminated.

An object of the present invention is to provide a method and arrangement for operating a drive arrangement in a watercraft, by means of which the above-mentioned problem can be solved so that an accurate course of travel of a watercraft can be provided, in particular during docking of the watercraft.

This object is obtained by means of a method as initially mentioned, wherein said method furthermore comprises adapting said position on which the force from said drive arrangement acts as a function of at least said speed and as a function of the influence of the position of the center of pressure of said watercraft, thereby maintaining said desired course of travel.

The object is also obtained by means of an arrangement as initially mentioned, in which said control unit is arranged for adapting said position on which the force from said drive arrangement acts as a function of at least said speed and as a function of the influence of the position of the center of pressure of said watercraft, thereby maintaining said desired course of travel.

BRIEF DESCRIPTION OF DRAWINGS

In the following, the invention will be described with reference to the appended drawings, wherein.

DETAILED DESCRIPTION

Figure 1:
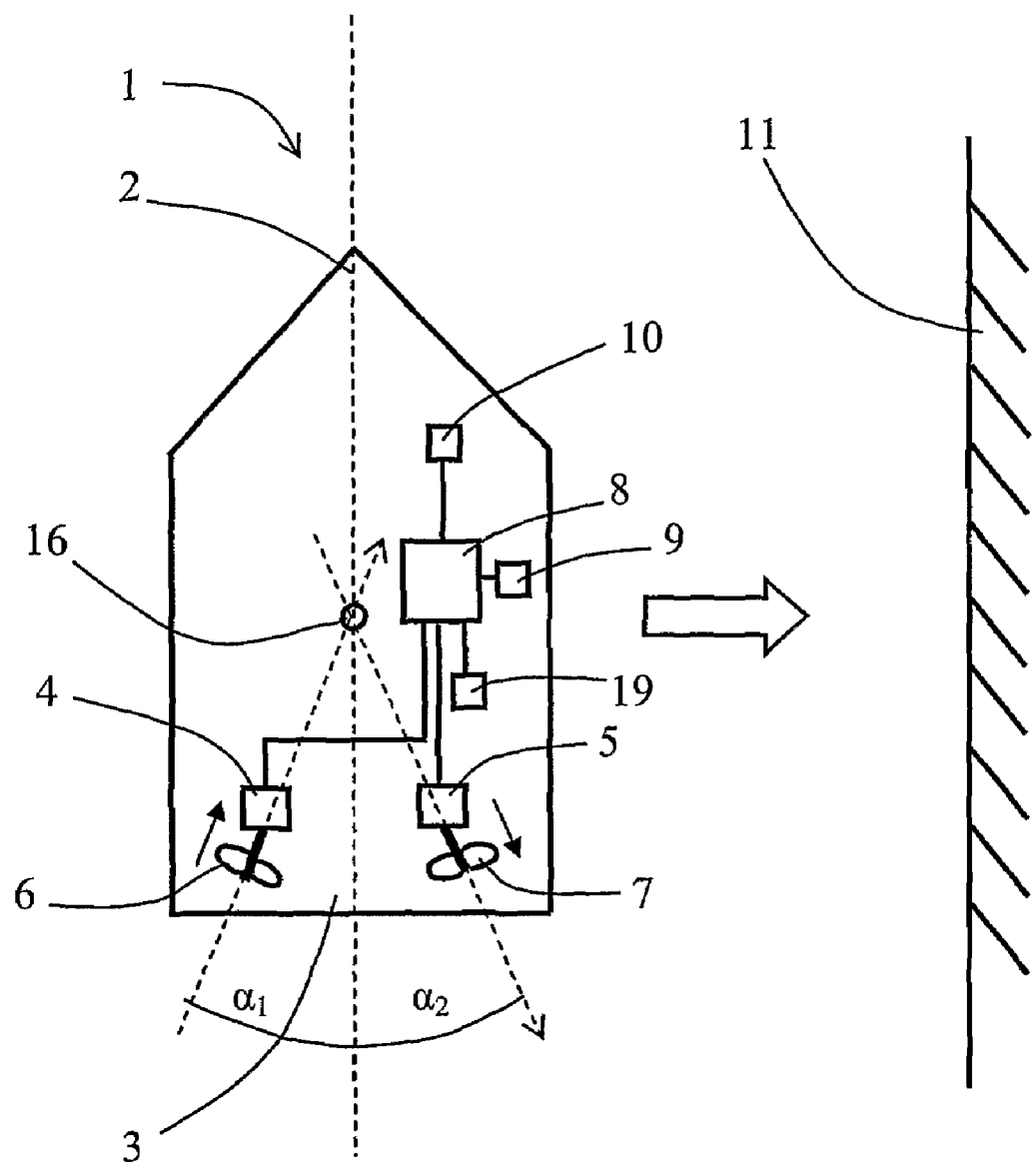
FIG. 1 is a simplified top view of a watercraft being arranged in accordance with the present invention.

FIG. 1 shows a simplified top view of a watercraft 1 in which the present invention can be used. Generally, the invention can be used in any type of watercraft, such as larger commercial ships, smaller watercraft such as leisure boats and other types of water vehicles or vessels. The invention is particularly useful for small leisure boats, but it is nevertheless not limited to such type of water vehicle only.

As indicated schematically in FIG. 1, the watercraft 1 is designed with a bow 2 and a stern 3. In the stern 3, two drive arrangements 4, 5 are mounted. More precisely, the watercraft 1 is provided with a first drive arrangement 4 arranged at the port side and a second drive arrangement 5 arranged at the starboard side. The drive arrangements 4, 5 are generally of conventional kind, for example in the form of combustion engines or any other type of drive units suitable for marine applications. In this embodiment, the drive arrangements 4, 5 are in the form of combustion engines, wherein the first drive arrangement 4 is arranged for driving a first propeller 6 and the second drive arrangement 5 is arranged for driving a second propeller 7. In alternative embodiments, the drive arrangements may include water jet devices or thrusters.

The two drive arrangements 4, 5 are independently steerable, which means that they are connected to and controllable by means of a control unit 8, which is suitably in the form of a computerized unit for receiving commands from control and steering units, which are indicated schematically by means of reference numeral 9. Such control and steering units are preferably constituted by throttle levers for the engines 4, 5 and a steering wheel. Such units are previously known as such, and for this reason they are not described in detail here. Based on received information from the control and steering units 9, the control unit 8 is arranged to control the first drive arrangement 4 and the second drive arrangement 5 in a suitable manner to propel the watercraft 1 with a requested direction and thrust.

When driving the watercraft 1 under normal operating conditions at sea, i.e. cruising at a given speed, the control unit 8 will receive control commands from the control and steering units 9. However, the driver of the watercraft 1 also has the option of controlling the watercraft 1 by means of a separate operating device 10, preferably in the form of a so-called joystick, which constitutes a second control and steering unit for controlling thrust and steering of the watercraft 1, i.e. the steering angles and engine speeds of the drive arrangements 4, 5. The operating device 10 is primarily intended to be used during docking of the watercraft 1, i.e. during a maneuver in which the driver of the watercraft 1 intends to steer it towards a given position at a harbor 11 for the purpose of landing the watercraft 1. In particular, the operating device 10 is useful during a docking maneuver in which the watercraft 1 is to be steered in a sideways direction, as will be described below in greater detail.

The invention is generally not limited to be used with an operating device 10 in the form of a joystick, but can be used with other types of operating devices which are used to receive some form of input signal to indicate a requested engine thrust and course of travel.

Also, as will be apparent from the following description, the invention is particularly suitable to be used during a docking maneuver. However, the principles of the invention are generally not limited to such an operating condition only, but can be used in other situations in which there is a demand for precise steering of a watercraft along a desired course of travel, in particular during steering in a sideways direction.

The operating device 10 according to the embodiment will now be described in detail with reference to FIG. 2. As mentioned above, the operating device 10 comprises a housing 12 which holds a manually operable lever 13, or a similar activation device. The lever 13 is freely movable in two directions x, y as indicated by means of broken lines in FIG. 2. The x direction is defined as being perpendicular to the y direction. The operating device 10 is electrically connected to the control unit 8 (see FIG. 1) for the purpose of controlling the course and thrust of the watercraft 1. This means that a given position of the lever 13 in the x and y directions is set by the driver of the watercraft 1 in order to choose a particular requested direction of movement of the watercraft 1 and a certain engine force of the watercraft 1. More precisely, the direction to which the lever 13 points corresponds to the desired direction of movement of the watercraft 1, and the degree of inclination of the lever 13 corresponds to the thrust provided by the drive arrangements 4, 5.

Figure 2:
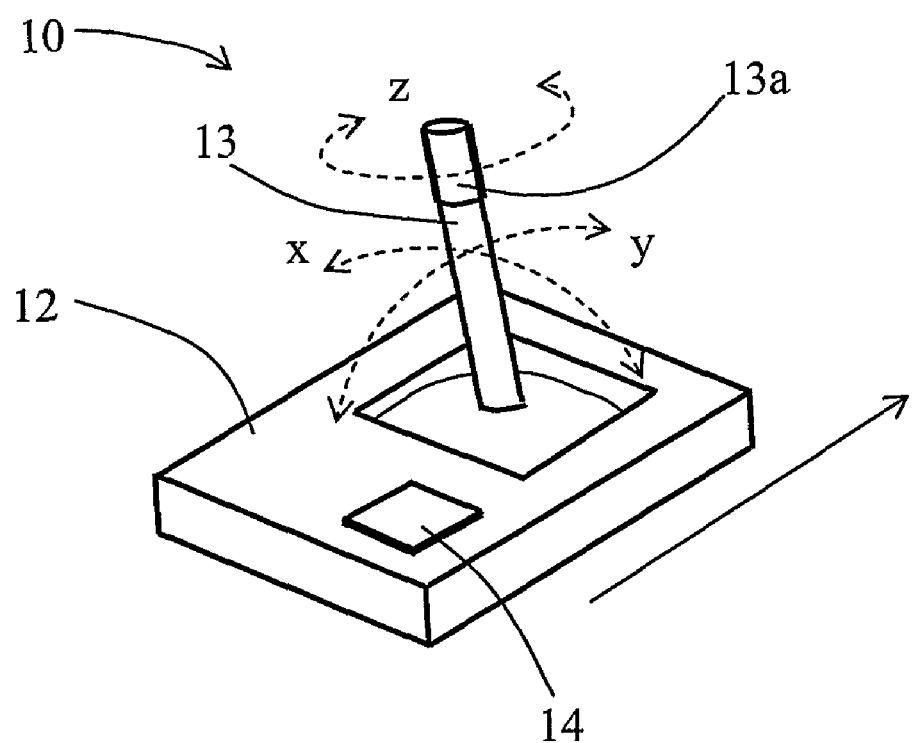
FIG. 2 is a perspective view of an operating device according to an embodiment of the invention.

Furthermore, according to the embodiment shown in FIG. 2, the lever 13 is arranged with an outer, rotatable section, which is indicated by means of reference numeral 13a in FIG. 2. This section 13a is arranged to be rotatable independently of the position and inclination of the lever 13. The rotational movement takes place in a longitudinal direction defined as the z direction, i.e. a movement about an imaginary axis which is defined as an extension of the longitudinal direction of the lever 13. The z direction is indicated in FIG. 2 by means of a curved arrow. Preferably, the rotatable section 13a can be rotated in either direction and is preferably also spring-biased so as to return to a neutral position when it is not rotated.

In the embodiment shown in FIG. 2, the longitudinal direction of the operating device 10 corresponds to the y direction, and also to the longitudinal direction of the watercraft 1, as indicated by means of an arrow in FIG. 2. The x direction of the lever 13 corresponds to a direction which is generally transverse to the longitudinal direction of the watercraft 1.

The control unit 8 is generally arranged to convert detected values corresponding to the actual position of the lever 13 (i.e. in the x and y directions) and the rotational position of the rotatable section 13a (i.e. in the z direction) into suitable control commands for a steering angle $\alpha$ and engine speed n for each one of the drive arrangements 4, 5. Preferably, this is obtained by allowing the position of the lever 13 (in the x and y directions) to control the engine speeds n1, n2 of each of the drive arrangements 4, 5, and by allowing the rotation of the rotatable section 13a (in the z direction) to control the steering angles $\alpha1$, $\alpha2$ of each one of the drive arrangements 4, 5.

According to the embodiment, the operating device 10 is intended to be used primarily during a docking maneuver. For this purpose, the operating device 10 is provided with a first activating device 14, for example in the form of a push button, which will activate a mode of operation in which the operating device 10 is used (instead of the control and steering units 9 mentioned above). Consequently, by pushing the activating device 14, the control unit 8 is set in "docking mode", i.e. an operating mode in which the drive arrangements 4, 5 are controlled by means of the operating device 10 only. By pushing on the first activating device 14 once again, the "docking mode" is terminated and the control and steering units 9 are used for operating the watercraft 1.

The operating device 10 can also be provided with other controls (not shown), for example for use during calibration of the movements of the lever 13 so as to correspond to the actual direction of travel of the watercraft. Such additional control devices are not described in detail here.

With reference to FIG. 1 again, a docking maneuver with the watercraft 1 will now be described. In particular, it will be described that the watercraft 1 is to be docked by steering it sideways towards the harbor 11, i.e. in a direction generally transverse to the longitudinal direction of the watercraft 1. This direction is indicated by means of an arrow in FIG. 1. Before carrying out the docking maneuver, the corresponding activating device 14 (see FIG. 2) must be pressed so that "docking mode" is entered. This normally corresponds to a phase when the watercraft approaches its intended position at the harbor.

During docking as shown in FIG. 1, the drive arrangements 4, 5 should be set in an operating condition in which the first drive arrangement 4 is operated in forwards drive with a certain engine speed n1, whereas the second drive arrangement 5 is operated in reverse with a certain engine speed n2. Also, the first drive arrangement 4 is arranged with a certain angle αi with reference to the longitudinal direction of the watercraft 1, whereas the second drive arrangement 5 is also arranged with a certain angle α2 with reference to the longitudinal direction of the watercraft 1. It should be noted that the watercraft 1 has a particular imaginary vertical axis which constitutes the center of rotation of the watercraft 1. The center of rotation is an imaginary point which defines a vertical axis about which the watercraft may rotate. Also, the watercraft 1 also presents an imaginary point representing its center of gravity, which is indicated by means of reference numeral 16 in FIG. 1. It can be assumed that when the watercraft 1 is travelling at a low speed, the position of the center of gravity 16 is generally equal to the position of the center of rotation.

The docking movement is obtained by manipulating the lever 13 (see FIG. 2) on the operating device 10 in generally the same direction as the requested direction of movement of the watercraft 1, i.e. to the right as regarded in FIG. 1 and as indicated by an arrow in FIG. 1. This corresponds to movement of the lever 13 along the x direction as shown in FIG. 2. By operating the drive arrangements 4, 5 in opposite directions and with their respective force acting along a direction extending through the center of gravity 16, the watercraft 1 will now move sideways towards the harbor 10. This is the direction which corresponds to the resulting force acting from the drive arrangements 4, 5 towards the center of gravity 16.

During docking, the operating device 10 is preferably used so that when moving the lever 13 in the x and y directions towards any of the sides (left or right), the engine speeds n1, n2 of each of the drive arrangements 4, 5 are affected only, i.e. the angles α1, α2 of the drive arrangements 4, 5 are not affected. Secondly, when the rotatable section 13a is rotated, the angles α1, α2 are affected whereas the engine speeds n1, n2 are not.

Consequently, the control unit 8 is arranged to control the engine speeds n1, n2 to suitable values depending on the direction of the lever 13 in the x and y directions, and also to control the angles α1, α2 to suitable values depending on the degree of rotation of the rotatable section 13a. This means that during docking, the control unit 8 is arranged to convert the position of the lever 13 and its rotatable section 13a to suitable steering angles and engine speeds of the two drive arrangements 4, 5 to obtain a direction of travel of the watercraft 1 which corresponds to the actual physical direction of the lever 13.

Figure 3:
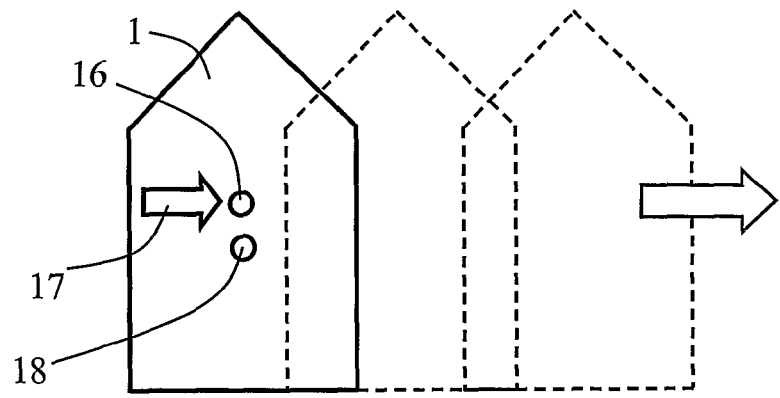
FIG. 3 is a schematical view of a watercraft moving in a sideways direction during a docking maneuver.

The main principles of the present invention will now be described with reference initially to FIG. 3, which is a simplified and schematical view of the above-mentioned watercraft 1 when moving in a sideways direction during a docking maneuver. This movement is caused by suitable control of the drive arrangements 4, 5 and using the operating device 10 (not shown in FIG. 3), as described above.

It should be noted that the drive arrangements 4, 5 are operated in a manner so that the direction of force which affects the watercraft 1 extends through a specified position which corresponds to its center of gravity 16. This is shown by means of an arrow 17 in FIG. 3. Assuming that the watercraft 1 has a relatively low speed during the docking procedure, for example in the magnitude of 0.5 knots, the watercraft 1 will move in a straight sideways direction, i.e. to the right as shown in FIG. 3, as shown schematically by means of broken lines. This initial direction of force 17 is suitably stored as a predetermined set of data in the control unit 8 and corresponds to the center of gravity of the particular type of watercraft in which the invention is used.

During docking at relatively low speeds, the center of rotation of the watercraft 1 can be said to be substantially equal to the center of gravity 16 of the watercraft 1. For this reason, the drive arrangements 4, 5 are controlled so that the combined direction of force acting from the drive arrangements 4, 5 extends through the center of rotation. The center of rotation is an imaginary point which can be calculated for each watercraft and which defines a vertical axis about which the watercraft may rotate. However, during docking at relatively high speeds, typically in the magnitude of 2 knots and more, the watercraft 1 may have a tendency to travel along a curved direction of travel, i.e. it will rotate about said imaginary center of rotation. This curve-shaped direction is shown in a schematical manner by means of broken lines in FIG. 4.

The present invention is based on the insight that such an undesired curved direction of travel may be the result of a particular influence from the center of pressure of the watercraft 1. The watercraft 1 can be said to define such a center of pressure, which is indicated by means of reference numeral 18 in FIG. 3, as an imaginary point of its hull on which the force acting from the water is directed.

Figure 4:
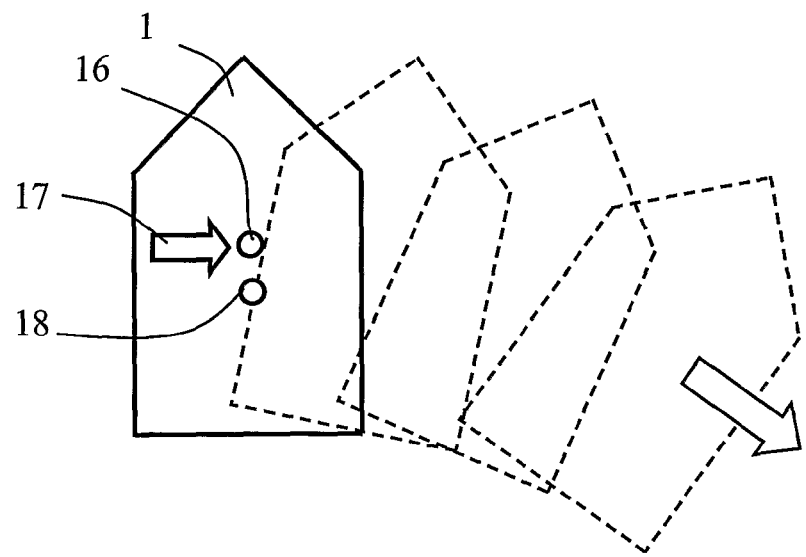
FIG. 4 is a further schematical view, corresponding to FIG. 3 but showing the watercraft in an operating condition in which is has a tendency to rotate.

With reference to the problem with prior art described initially, it has been noted that the curved course shown in FIG. 4 may occur as a consequence of the center of pressure 18 being gradually more influential as the speed of the watercraft 1 increases. In other words, the position of the center of pressure 18 will gradually change the position of the center of rotation as a result of an increasing speed, so that the center of rotation is no longer generally equal to the center of gravity 16. This means that a force which acts on the center of gravity 16 will no longer act on the center of rotation when the watercraft 1 has a relatively high speed. As a consequence, a rotating torque will act on the watercraft 1 so that it assumes the curve-shaped course of travel shown in FIG. 4.

In order to solve the above-mentioned problem, the present invention is based on the general principle that the position on which the force from the drive arrangements 4, 5 is applied on the watercraft 1 is gradually displaced towards the position of the center of pressure 18. This means that the initial position where the force is applied (corresponding to a relatively low speed), i.e. at the center of gravity 16, is adapted into a new position in which the force from the drive arrangements 4, 5 is applied (corresponding to a relatively high speed). This is shown schematically in FIG. 5, in which the arrow 17, which indicates the point at which the force from the drive arrangements 4, 5 acts, is displaced slightly and directed at a point which is more close to the position of the center of pressure 18. In this manner, the invention is used in order to compensate for the fact that the position of the center of rotation has gradually moved. This is due to the increase in speed of the watercraft 1, and also due to certain other factors as will be explained below.

Figure 5:
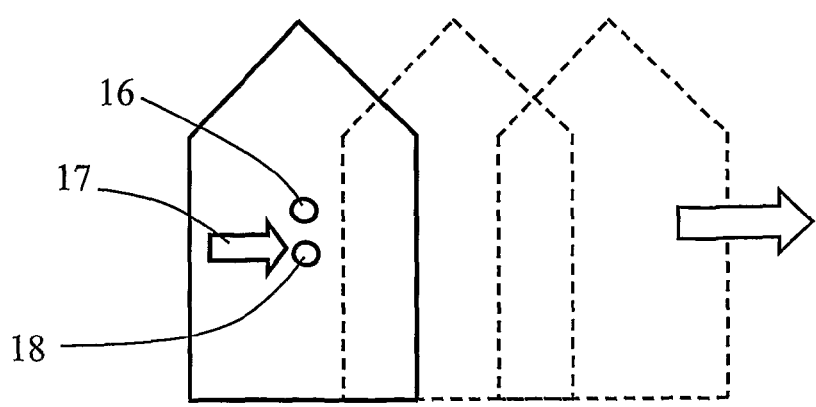
FIG. 5 is a further schematical view, corresponding to FIGS. 3 and 4 but showing the watercraft being controlled in accordance with the principles of the invention.

With reference to FIG. 1 again, it can be noted that according to the shown embodiment of the invention, the control unit 8 (cf. FIG. 1) is arranged to compensate for the increase in speed of the watercraft 1 by adapting the position where the force is applied. This is suitably achieved by controlling the operating conditions of the drive arrangements 4, 5, i.e. the engine speed and steering angle of each drive arrangement 4, 5. In practice, this is suitably carried out by using at least an input parameter in the form of the speed v of the watercraft 1. For this reason, it is assumed that a value representing the speed v is available in the control unit 8 by using a speed detector 19 in the watercraft. Such a speed detector 19 is previously known as such, and for this reason it is not described in detail here. According to the principles of the invention, a value representing the actual speed v, as detected by the speed detector 19 and fed to the control unit 8, is used for determining the position on which the force of the drive arrangements 4, 5 should act on the watercraft 1. This corresponds to the position of the arrow 17 as indicated in FIGS. 3-5.

Generally, the control unit 8 is arranged so that the degree of displacement of the direction of the force 17 is adapted by using at least the speed v of the watercraft 1 as an input parameter. Other factors may also be considered. According to the embodiment, a factor corresponding to the hull shape of the watercraft 1 is used for determining an adapted value of the direction of force 17 as the speed v increases. This means that the control unit 8 comprises stored data representing a conversion formula for determining the actual desired direction of force 17 depending on the speed v and hull shape. Such a conversion formula is suitably of the type where:

$$d=k(v \cdot a)$$

where d is the distance between the initial direction of force 17 (see FIG. 3) and a further, adapted position (see FIG. 5) in which the watercraft 1 has reached a certain speed v. Also, the term a, as indicated in the formula above, reflects the hull shape of the watercraft 1 and is based on estimations for the particular watercraft 1 in question. A hull having a more complicated and irregular shape can be expected to have a higher impact on the distance which is necessary for displacing the direction of force 17 than a simple and symmetrical hull shape. Consequently, such a complicated and irregular shape of the hull would normally be given a higher value of the term a than a simple hull shape. The term k as included in the formula is a constant.

The principle behind the invention is not limited to any particular conversion formula but is based on the basic assumption that at least the speed v of the watercraft 1, and preferably also the hull shape, needs to be taken into account when determining the degree of displacement of the direction of force 17.

In summary, it should be noted that the main cause of the problem on which the invention is based, i.e. the fact that the direction of the watercraft 1 may deviate from its intended course straight to the side, is due to changes in the center of rotation of the watercraft. With particular reference to FIG. 5, it has been noted that the center of pressure 18 is of higher influence, when adapting the position 17 where the force is applied, as the speed v increases. For this reason, and as mentioned above, the arrangement according to the invention is adapted for determining the actual speed v of the watercraft 1.

Such information may be provided by means of an actual speed detecting device delivering a measurement corresponding to the speed v, or may be a software algorithm used for estimating a value of the speed v based on other available measurements. For example, a value representing an estimate of the speed v of the watercraft 1 can be provided by integrating a signal corresponding to the engine speed (i.e. n1 or n2) of the first drive arrangement 4 or second drive arrangement 5 over time. Alternatively, a value representing the speed v can be obtained by integrating a signal from an accelerometer (not shown in the drawings). Consequently, the invention is not limited to any particular arrangement or method for providing a measurement of the speed v of the watercraft 1.

Figure 6:
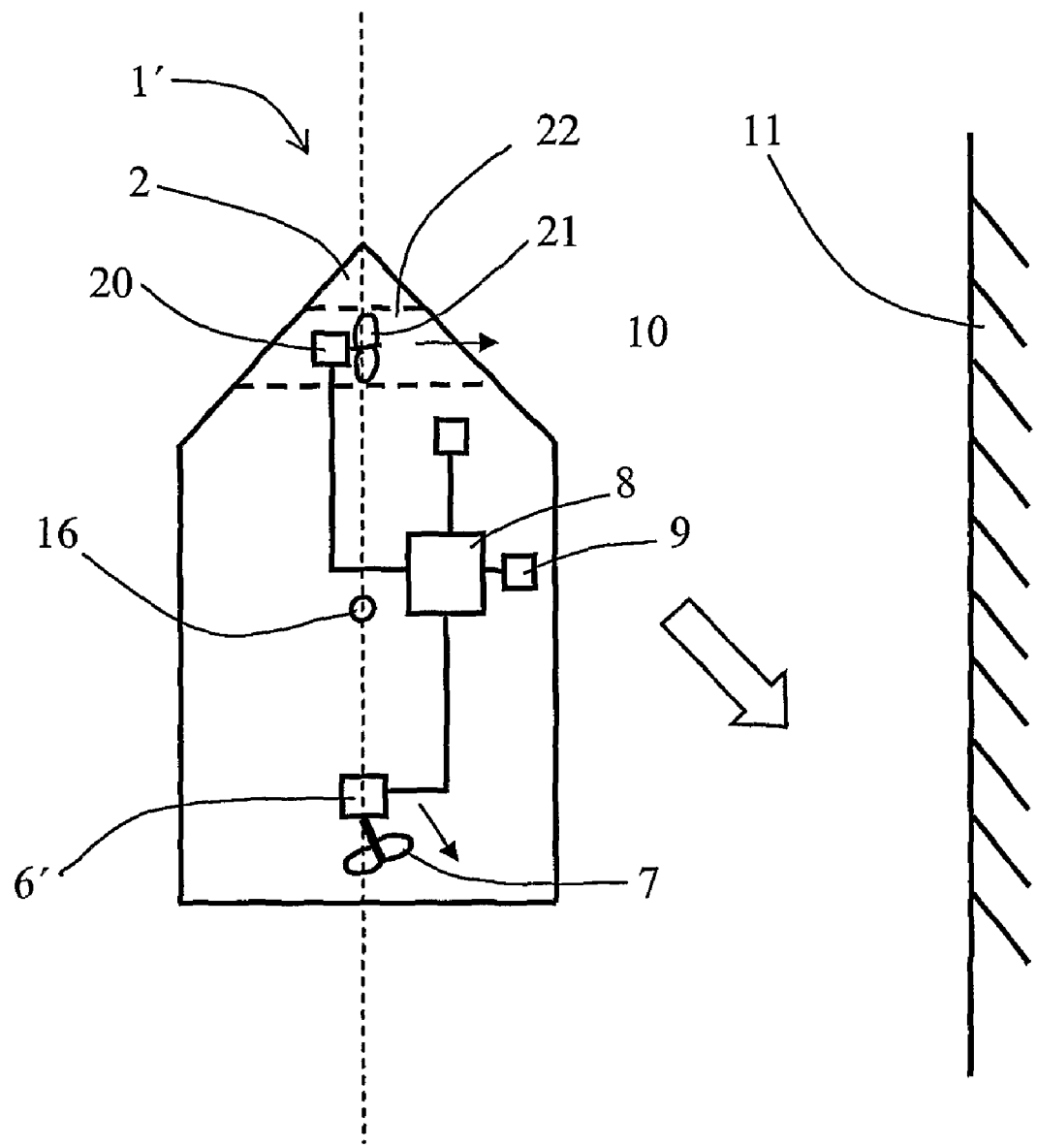
FIG. 6 is a simplified top view of a watercraft being arranged in accordance with a further embodiment of the invention.

In FIG. 6, an alternative embodiment of the invention is described. This embodiment relates to a watercraft 1' of the type which comprises a so-called bow thruster 20, i.e. a drive arrangement with a propeller 21 which is mounted in the bow 2 in a manner which is generally transverse to the longitudinal direction of the watercraft. Suitably, the bow thruster 20 and its propeller 21 is mounted in a tunnel 22 which extends transverse to the longitudinal direction of the watercraft 1'. The purpose of the bow thruster 20 is to generate a side force on the bow 2 during docking. In this manner, the watercraft can be more easily controlled when docking or maneuvering at low speeds. As shown in FIG. 6, the watercraft 1' is provided with a bow thruster 20 and also with a rear-mounted single drive arrangement 6'. Such an arrangement can also be used for docking at a harbor 11. However, with this particular drive system, the docking can only be carried out while travelling along a generally diagonal direction, as shown in FIG. 5. This is due to the fact that the drive arrangement 6' cannot normally be positioned to propel the watercraft in a direction straight to the side. However, the principles of the present invention can be used for obtaining an accurate course of travel by adapting the position at which the force from the bow thruster 20 acts, in a similar manner as described above with reference to FIGS. 1-5.

According to a further embodiment, which is not shown in the drawings, a similar arrangement can be provided in the stern of a watercraft, a so-called stern thruster.

The present invention can be implemented in watercraft comprising a bow thruster or a stern thruster, or in watercraft comprising both a bow thruster and a stern thruster.

The present invention is not limited to the above-mentioned embodiment, but can be varied within the scope of the appended claims. For example, the invention is suitable for different types of watercraft. Also, the operating device 10 can be implemented in other ways than as a joystick.

Furthermore, the principles of the invention are not limited to being used during docking only.

The invention claimed is:

1. A method of controlling a drive arrangement in a watercraft to implement a sideways maneuver devoid of rotation of the watercraft, the method comprising steps of:
providing, thrust and steering commands from an operating device which is connected to a control unit;
controlling the drive arrangement while the watercraft travels at or below a first speed in response to commands from the operating device for obtaining a desired sideways course of travel of the watercraft by generating a force directed toward a defined position on the watercraft;
increasing a speed of the watercraft to a second speed above the first speed; and
changing the position toward which the force from the drive arrangement is directed as a function of at least the second speed and a location of a center of pressure of the watercraft to prevent rotation of the watercraft.

2. A method according to claim 1, wherein the method is carried out during a docking maneuver of the watercraft.

3. A method according to claim 1, comprising
changing the position toward which the force from the drive arrangement is directed so that, at the first speed of the watercraft, the position is closer to a center of gravity of the watercraft than at the second speed of the watercraft, the position toward which the force is directed being closer to the center of pressure of the watercraft at the second speed than at the first speed.

4. A method according to claim 1, wherein the step of providing thrust and steering commands from the operating device comprises providing movements in two perpendicular directions and providing rotational movements about a longitudinal direction.

5. A method according to claim 1, wherein the defined position is the center of gravity of the watercraft.

6. A method according to claim 1, wherein the first speed is less than 2.0 knots.

7. A method according to claim 1, wherein the position toward which the force from the drive arrangement is directed at the second speed is changed as a function of at least the second speed and a location of a center of pressure of the watercraft.

8. An arrangement for controlling a drive arrangement in a watercraft comprising:
   an operating device for providing thrust and steering commands;
   a control unit arranged for controlling the drive arrangement based on commands provided from the operating device for obtaining a desired sideways course of travel of the watercraft, the control unit being arranged to control the drive arrangement, when the watercraft travels at a speed at or be a first speed, to generate a force which is directed toward a defined position on the watercraft; and
   a speed detector for determining a speed of the watercraft;
   wherein the control unit is configured to change the position toward which the force from the drive arrangement is directed to cause the watercraft to move sideways without rotating when the watercraft travels at a second speed above the first speed, wherein the control unit is arranged to change the position toward which the force from the drive arrangement is directed as a function of at least the second speed and a location of a center of pressure of the watercraft.

9. An arrangement according to claim 8, wherein the operating device comprises a joystick, the joystick being adjustable in two perpendicular directions and also being arranged for being rotated along its longitudinal direction.

10. An arrangement according to claim 8, wherein the drive arrangement comprises at least two engines having corresponding propellers, the engines being independently controllable by the control unit.

11. An arrangement according to claim 8, wherein the defined position is the center of gravity of the watercraft.

* * * * *